R. McMANUS.
Banjo.

No. 215,647. Patented May 20, 1879.

Witnesses:
Bloomfield Littell
Thomas Fisher

Inventor:
Robert McManus
by Forbes & Jones
Attorneys

UNITED STATES PATENT OFFICE.

ROBERT McMANUS, OF BROOKLYN, ASSIGNOR TO HERMAN SONNTAG AND WILLY SONNTAG, OF EDGEWATER, NEW YORK.

IMPROVEMENT IN BANJOS.

Specification forming part of Letters Patent No. 215,647, dated May 20, 1879; application filed April 10, 1879.

*To all whom it may concern:*

Be it known that I, ROBERT McMANUS, of the city of Brooklyn, in the county of Kings and State of New York, have invented a new and useful Improvement in Banjos; and I do hereby declare that the following is a full, clear, and exact description thereof, reference being had to the accompanying drawings, forming a part of this specification, in which—

Figure 1:
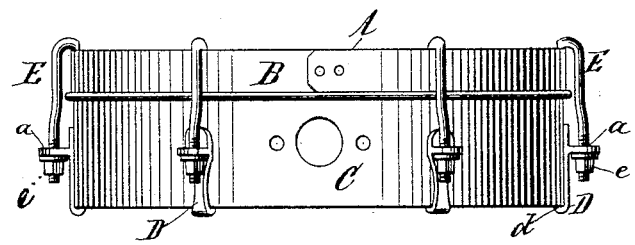
Figure 2:
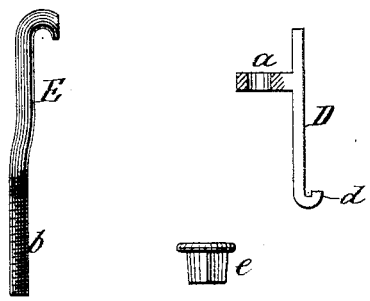

Figure 1 represents a side elevation, showing my invention as applied; and Fig. 2, the respective parts of the same detached.

This invention relates to devices for securing and adjusting the tension of the heads of banjos; and it consists in the combination of a bracket or plate provided with a hook for engagement with the edge of the rim, and a detachable hook for engagement with the hoop upon which the head is stretched, said bracket having a projecting perforated lug, through which the threaded stem of said hook is passed, and the parts connected by means of a screw-nut or other equivalent device.

Heretofore the bracket has been attached to the rim by means of a threaded bolt and nut passed through the same; and the object of this invention is to cheapen the production of the device itself, to save time and labor in the application, render the same more efficient, and present a superior finish.

A number of these devices are distributed around the circumference of the rim in each instrument, as shown in the drawings, and the economy effected in each device is multiplied in the complete instrument.

In the drawings, A represents the head of the instrument; B, the hoop over which the head is drawn, and C the rim upon which the hoop is adjusted, these parts being constructed and relatively arranged in the ordinary manner.

D represents the bracket or plate, (shown detached in Fig. 2,) constructed of metal or other suitable material, and in any desired design. This bracket is provided with an inwardly-directed hook, *d*, that engages with the exposed edge of the rim C, and is also provided with a perforated lug, *a*, arranged about midway of its length and projecting outwardly, as shown.

E is a hook, having a threaded stem, *b*, provided with a nut, *e*. This hook engages with the top of the hoop B, and its threaded stem passes through the projecting lug *a* upon the bracket, the nut *e*, when applied, bearing upon the under side of the lug *a*, drawing down the hoop E, and increasing the tension of the head over the top of the rim C.

In lieu of the screw-thread and nut upon the stem of the hook E, said stem may be slotted to receive a wedge-shaped or split key, if desired.

The hooks E and *d*, engaging the extremes of the respective parts in line with the movement of the same upon each other, avoid the tendency to spring, warp, or split the rim, or to cut the bracket.

The mechanical advantages attending this device, as compared with those in common use and herein referred to, and the economy effected in its production by dispensing with a bolt and nut for securing it to the rim, and also in avoiding the necessity of perforating the rim to receive such bolt, particularly when a metallic rim is employed, cannot be questioned.

Having thus fully described my invention, what I claim, and desire to secure by Letters Patent, is—

The combination of the bracket D, provided with the hook *d* and perforated lug *a*, and the detachable hook E, provided with the nut *e* or equivalent fastening device, substantially as described.

ROBERT McMANUS.

Witnesses:
WILLY SONNTAG,
C. D. CURTIS.